April 21, 1936.  A. M. STANLEY  2,037,832

VEHICLE WHEEL

Filed Dec. 20, 1934

Witness
Paul F. Bryant

Inventor
Arthur M. Stanley
by his attorneys
Fish Hildreth Cary & Furney

Patented Apr. 21, 1936

2,037,832

UNITED STATES PATENT OFFICE 2,037,832

VEHICLE WHEEL

Arthur M. Stanley, Lynn, Mass., assignor to Stanley Engineering, Inc., Boston, Mass., a corporation of Massachusetts Application December 20, 1934, Serial No. 758,468

3 Claims. (Cl. 152—10)

The present invention relates to improvements in a tire and rim construction by virtue of which the hazards due to sudden tire deflation are substantially avoided.

Those skilled in the art are well aware of the fact that with comparatively large pneumatic tires and high speeds of travel, sudden deflation, whatever the cause, not only seriously injures the tire but creates a serious hazard due to inability to control the course of the vehicle.

It is the purpose and object of the present invention to provide a construction by virtue of which the weight of the vehicle is supported in a manner to prevent complete collapse of the tire with the results which inevitably flow therefrom.

According to the present invention, I provide in effect a continuous annular ring mounted concentrically with the rim and projecting into the space within the pneumatic casing. This ring is rigidly held in connected relation to the rim and in the normal operation of the casing in its inflated condition has no function. Upon deflation of the tire, however, with the result of the flattening of the casing, the latter is sustained by contact of the inner ring well beyond a region which will cause break-down of the casing side wall or cutting by the sides of the rim.

In the preferred form of the invention I provide a ring in several sections which complement one another to form a completed ring having an internal securing flange which is engaged between the two parts of a split rim, the clamping of the rim parts in assembled relation securing the ring in position through the flange. In this position the ring is concentric with the rim, and positioned approximately centrally thereof when considering the rim transversely. It may be employed with the usual outer casing member and an inner tube which may be shaped to surround the projecting ring.

Figure 1:
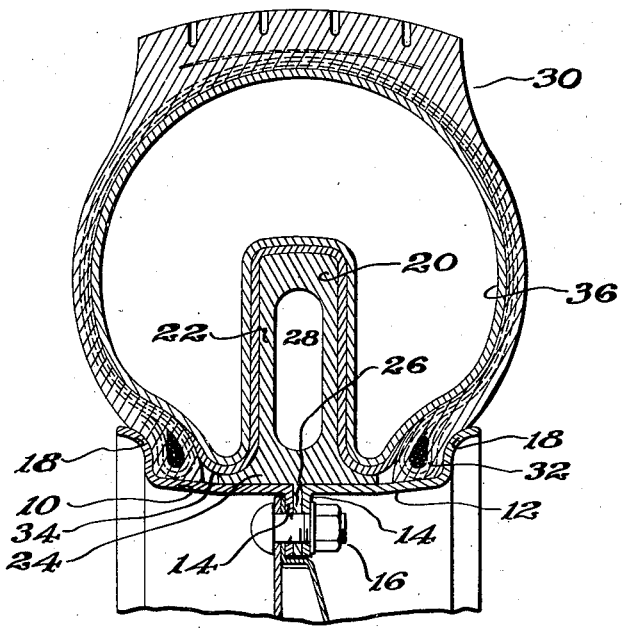
Figure 2:
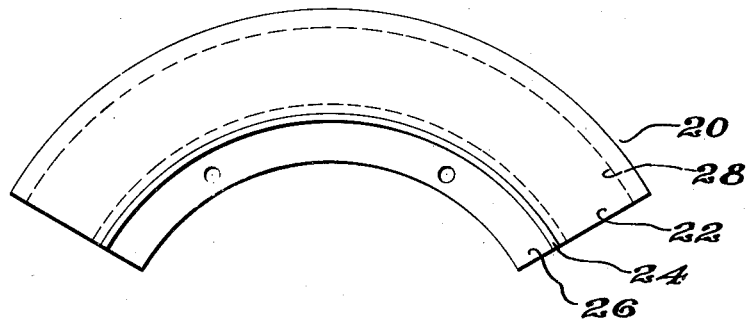

In the accompanying drawing illustrating the preferred form of the invention, Fig. 1 represents a section in elevation of the improved rim construction with a tire mounted thereon; and Fig. 2 is a detail illustrating one of the ring sections, three of which complement one another to make up the completed ring.

The rim shown in the illustrated embodiment of the invention may be employed in conjunction with a wheel of the type disclosed in my copending application Serial No. 516,869, filed February 19, 1931. This type of wheel embodies a two-part rim consisting of complementary sections 10 and 12, each having an inwardly projecting securing flange 14 which are connected by bolts 16. When maintained in assembled relation, the two parts of the rim form a complete rim with holding flanges 18.

According to the present invention the supporting ring consists of three sections 20 each forming a third of a circle, and each consisting of an upstanding circular support 22 having a broadened base portion 24 and an integral securing flange 26 designed to project between the flanges 14, and pierced for engagement by the securing bolts 16. When the three parts of the ring are assembled to form the completed member, the securing flange is locked between the flanges of the rim sections so that the ring is rigidly connected to the split rim. As indicated more particularly in Fig. 1, the portion 22 may be provided with an opening 28 extending therethrough to lighten the construction. The member may also be rounded at the edges to avoid injury or defacement of the inner tube or flap engaging therewith.

The pneumatic casing indicated at 30 may be of the usual form, having the beads 32 which are seated within the rim flanges. Positioned within the pneumatic casing and extending about the portion 22 of the ring is a protecting flap 34, and located within the casing and engaging with the flap is an inner tube 36 which provides the usual air-tight compartment for pneumatically supporting the casing.

It will be evident that with this construction the tire may be readily demounted by removing one-half of the split rim and the sections of the ring 20, thereafter demounting the casing itself in deflated condition. A new tire may be mounted in a like manner, assembling the ring in sections after the casing has been partially mounted upon the rim, and finally assembling the rim and inflating the casing. Sudden deflation of the casing, through a blow-out or other cause, does not permit collapse of the casing beyond the region of support provided by the circular ring 20 which projects well beyond the rim flanges 18, thus avoiding rupture of the side walls or cutting of the casing by engagement with the rim section. The provision of the ring sections, each with its integral attaching flange designed for engagement by the two parts of the split rim, provides a simple and efficient method of permanently connecting the ring to the rim without substantial interference with the mounting and demounting of the casing upon the rim.

What is claimed is:

1. The combination with a vehicle wheel of a rim section partible in the plane of the wheel, a sectional and non-flexible supporting ring seating upon and generally concentric with the rim and engaged and rigidly clamped between the two parts of the rim when the latter are assembled, and a casing connected to the rim and surrounding the sectional ring which projects thereinto during the use of the casing.

2. The combination with a vehicle wheel of a two-part rim section detachably connected to permit removal of the casing upon disassembly, a casing mounted upon the rim, and a non-flexible and sectional supporting ring seating upon and generally concentric with the rim and having an inwardly projecting flange engaged and rigidly clamped between the two parts of the rim when the latter are assembled.

3. The combination with a vehicle wheel of a two-part split rim, each part having complementary and inwardly projecting flanges which serve to connect the two parts of the rim together, a casing mounted upon the rim in assembled relation, a series of circular segments combining to form a complete ring when assembled, each of the segments having a base portion seating upon the face of the rim, and a securing flange engaged between the flanges of the rim to secure the segments within the casing when the latter is mounted upon the rim.

ARTHUR M. STANLEY.